(12) United States Patent
Tsai et al.

(10) Patent No.: US 11,493,709 B2
(45) Date of Patent: Nov. 8, 2022

(54) HEAT SINK FOR PLUGGABLE OPTICAL MODULE WITH COMPRESSIBLE THERMAL INTERFACE MATERIAL

(71) Applicant: Cisco Technology, Inc., San Jose, CA (US)

(72) Inventors: Yao Tsan Tsai, San Jose, CA (US); Yong Guo Chen, Shanghai (CN); Hua Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/032,205

(22) Filed: Sep. 25, 2020

(65) Prior Publication Data
US 2022/0099903 A1   Mar. 31, 2022

(51) Int. Cl.
*G02B 6/42* (2006.01)

(52) U.S. Cl.
CPC ......... *G02B 6/4269* (2013.01); *G02B 6/4261* (2013.01); *G02B 6/4292* (2013.01)

(58) Field of Classification Search
CPC .. G02B 6/4269; G02B 4/4292; G02B 6/4261; G02B 6/4268–4269; G02B 6/4292
See application file for complete search history.

(56) References Cited

U.S. PATENT DOCUMENTS

| 8,879,262 | B2 * | 11/2014 | Shi | G02B 6/428 361/704 |
|---|---|---|---|---|
| 2011/0317964 | A1 * | 12/2011 | Downs | G02B 6/4201 385/92 |
| 2019/0273340 | A1 * | 9/2019 | D'Inca | H01L 35/28 |
| 2020/0229321 | A1 | 7/2020 | Dogruoz et al. | |

OTHER PUBLICATIONS

"Bergquist GAP PAD TGP HC3000," Henkel Adhesive Technologies, Nov. 2018 <https://www.henkel-adhesives.com/us/en/product/thermal-pads/bergquist_gap_padtgphc3000.html>.
Ian Cutress, "Managing 8 Rome CPUs in 1U: Cray's Shasta Direct Liquid Cooling," AnandTech, Dated Nov. 19, 2018 <https://www.anandtech.com/show/13616/managing-16-rome-cpus-in-1u-crays-shasta-direct-liquid-cooling>.
Jon Anderson et al., "CFP MSA: CFP2 Hardware Specification," CFP, Dated May 2, 2013, pp. 1-59 (See p. 43) <http://www.cfp-msa.org/Documents/CFP-MSA_CFP2_HW-Spec-rev03.pdf>.

* cited by examiner

*Primary Examiner* — Michael P Mooney
(74) *Attorney, Agent, or Firm* — Patterson + Sheridan, LLP (57) ABSTRACT

Aspects described herein include an apparatus comprising a receptacle comprising a cage dimensioned to receive a pluggable optical module into an interior volume, An opening is defined in an exterior surface of the cage. The apparatus further comprises a heat sink assembly rigidly attached to the cage. The heat sink assembly comprises a thermal interface material extending through the opening into the interior volume. The thermal interface material is configured to compress when the pluggable optical module is received into the interior volume and contacts the thermal interface material.

19 Claims, 7 Drawing Sheets

HEAT SINK FOR PLUGGABLE OPTICAL MODULE WITH COMPRESSIBLE THERMAL INTERFACE MATERIAL

TECHNICAL FIELD

Embodiments presented in this disclosure generally relate to network devices, and more specifically, to implementations of heat sinks for pluggable optical modules with a compressible thermal interface material.

BACKGROUND

With increasing numbers of networked devices (e.g., the Internet of Things (IoT)), pluggable optical modules have increased in popularity for inter-networking communications due to their high data transmission rate. For example, Quad Small Form-factor Pluggable (QSFP) transceiver modules are widely used in state-of-the-art network switches.

Demand for increased communication speeds will result in increased power consumption of the pluggable optical modules. For example, the maximum power consumption of a QSFP transceiver module is about 3.5 watts (W), which currently presents a challenge for cooling a network switch. In comparison, the next generation of pluggable optical modules are expected to consume between 15 and 20 W.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is an apparatus comprising a receptacle comprising a cage dimensioned to receive a pluggable optical module into an interior volume. An opening is defined in an exterior surface of the cage. The apparatus further comprises a heat sink assembly rigidly attached to the cage. The heat sink assembly comprises a thermal interface material extending through the opening into the interior volume. The thermal interface material is configured to compress when the pluggable optical module is received into the interior volume and contacts the thermal interface material.

Another embodiment presented in this disclosure is a method of fabricating an optical apparatus, the method comprising arranging a heat sink assembly relative to a receptacle. The receptacle comprises a cage dimensioned to receive a pluggable optical module into an interior volume. An opening is defined in an exterior surface of the cage. The method further comprises rigidly attaching the heat sink assembly to the cage, whereby a thermal interface material of the heat sink assembly extends through the opening into the interior volume. The thermal interface material is configured to compress when the pluggable optical module is received into the interior volume and contacts the thermal interface material.

Another embodiment presented in this disclosure is an apparatus comprising a plurality of receptacles, each receptacle comprising a respective cage dimensioned to receive a pluggable optical module into a respective interior volume. A respective opening is defined in an exterior surface of the respective cage. The apparatus further comprises a heat sink assembly rigidly attached to the respective cages of the plurality of receptacles. The heat sink assembly comprises a thermal interface material extending through the respective openings into the respective interior volumes. The thermal interface material is configured to compress when the pluggable optical module is received into any of the respective interior volumes and contacts the thermal interface material.

EXAMPLE EMBODIMENTS

The increased power consumption of pluggable optical modules will continue to present challenges for adequately cooling network devices. Embodiments described herein include an apparatus comprising a receptacle comprising a cage dimensioned to receive a pluggable optical module into an interior volume. An opening is defined in an exterior surface of the cage. The apparatus further comprises a heat sink assembly rigidly attached to the cage. The heat sink assembly comprises a thermal interface material extending through the opening into the interior volume. The thermal interface material is configured to compress when the pluggable optical module is received into the interior volume and contacts the thermal interface material.

The apparatus may further comprise one or more additional receptacles each configured to receive a respective pluggable optical module, and the heat sink assembly is rigidly attached to the one or more additional receptacles. The heat sink assembly may have any suitable implementation, including metallic fins, a heat pipe, a vapor chamber, or a liquid-cooled plate.

Beneficially, the compliance of the thermal interface material may operate to fill any air pockets and thereby reduce thermal resistance at the interface between the optical module and the heat sink assembly. Using the compliance of the thermal interface material, the apparatus need not include springs to provide a compression force to ensure mechanical contact at the interface.

In spring-based implementations, a protective film may be applied to a thermal interface material to reduce the insertion force for the optical module, and to reduce a potential of scratching the thermal interface material during insertion. However, the protective film may have a relatively low thermal conductivity which reduces the performance of the heat sink assembly. Additionally, the compliance of the thermal interface material may enable the use of rigid or less flexible implementations of the heat sink, such as a liquid-cooled plate.

Figure 1:
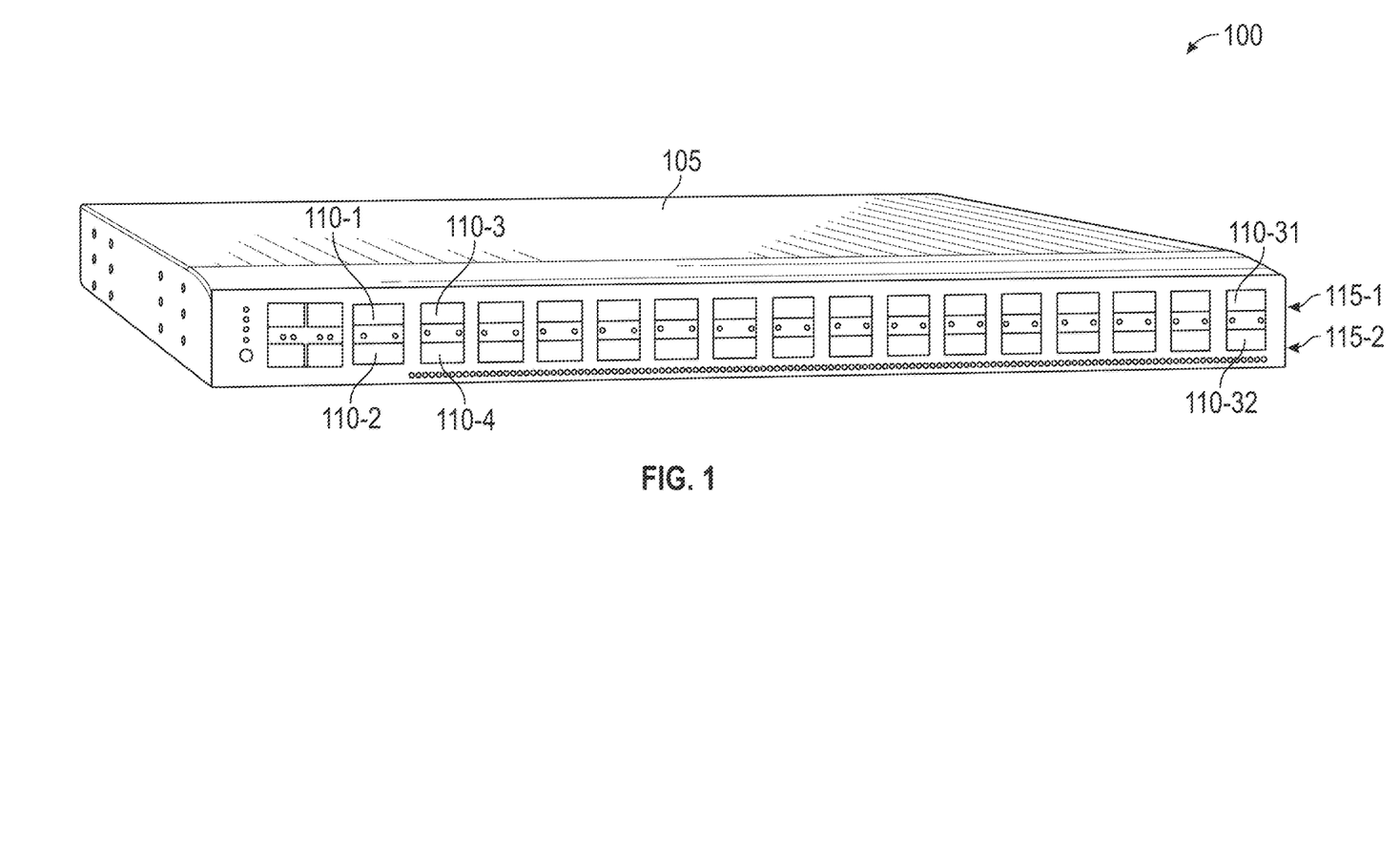
FIG. 1 illustrates a network device, according to one or more embodiments.

FIG. 1 illustrates a network device 100, according to one or more embodiments. The network device 100 may be implemented in any suitable form, such as network storage, a server, a switch, a router, a hub, a network interface card (NIC), and so forth. The network device 100 comprises an enclosure 105 that houses a plurality of electrical and/or optical components. The enclosure 105 may be implemented as a standalone device or a rack-mounted device.

The network device 100 comprises a plurality of receptacles 110-1, 110-2, 110-3, 110-4, 110-31, 110-32 (collectively or generically referred to as receptacle(s) 110) that are disposed within the enclosure 105 and that are externally accessible. Although thirty-two (32) receptacles 110 are shown, other numbers of receptacles 110 are also contemplated.

Each of the receptacles 110 is configured to receive a pluggable optical module (also referred to as an optical module) into an interior volume. The receptacles 110 may be dimensioned to receive optical modules having standardized or proprietary form factors. In some embodiments, each optical module comprises a transceiver module providing one or more transmit channels and one or more receive channels using one or more optical fibers. The various components of the network device 100 within the enclosure 105 may provide electrical and/or optical connectivity between the different optical modules and/or other functionality. The plurality of receptacles 110-1, 110-2, 110-3, 110-4, . . . , 110-31, 110-32 are arranged in two rows 115-1, 115-2, where the odd-numbered receptacles (110-1, 110-3, . . . , 110-31) are arranged in row 115-1 and the even-numbered receptacles (110-2, 110-4, . . . , 110-32) arranged in row 115-2.

Figure 2:
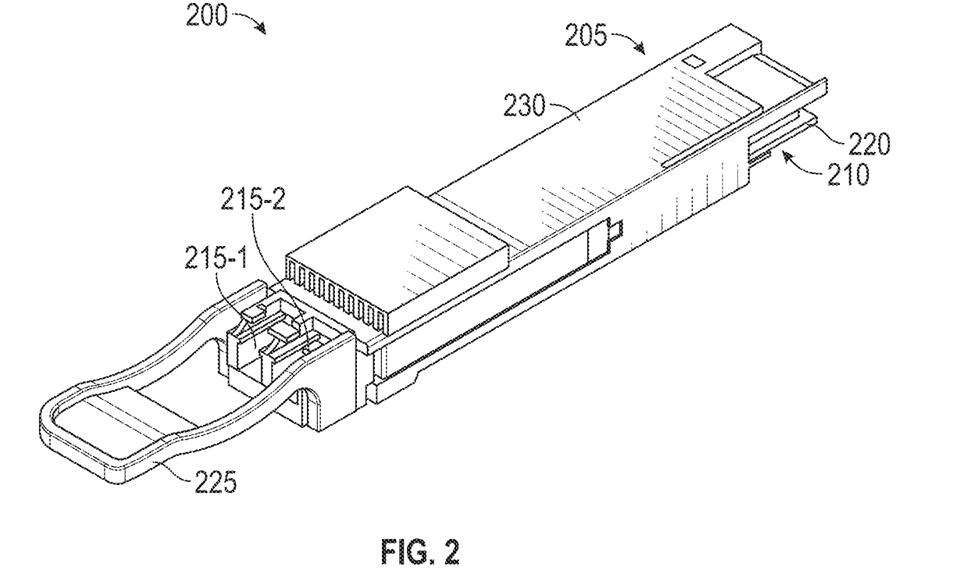
FIG. 2 illustrates a pluggable optical module, according to one or more embodiments.

FIG. 2 illustrates a pluggable optical module 200, according to one or more embodiments. The optical module 200 may be used in conjunction with other embodiments, such as being insertable into a receptacle 110 of the network device 100 of FIG. 1.

The optical module 200 comprises a housing 205 that houses electrical components and optical components, at least some of which may be mounted on a circuit board 210. One or more optical connectors 215-1, 215-2 are attached to the housing 205 and are configured to couple optical fibers with the optical components in the housing 205. The circuit board 210 defines an edge connector 220 that provides external electrical connections to the electrical components in the housing 205.

In some embodiments, a top surface 230 of the housing 205 is used as a thermally conductive interface for a heat sink assembly that removes heat generated through operation of the electrical components and/or optical components of the optical module 200.

The optical module 200 further comprises a handle 225 attached to the housing 205. The handle 225 generally assists in the insertion of the optical module 200 into a receptacle and/or removal of the optical module 200 from the receptacle.

Figure 3:
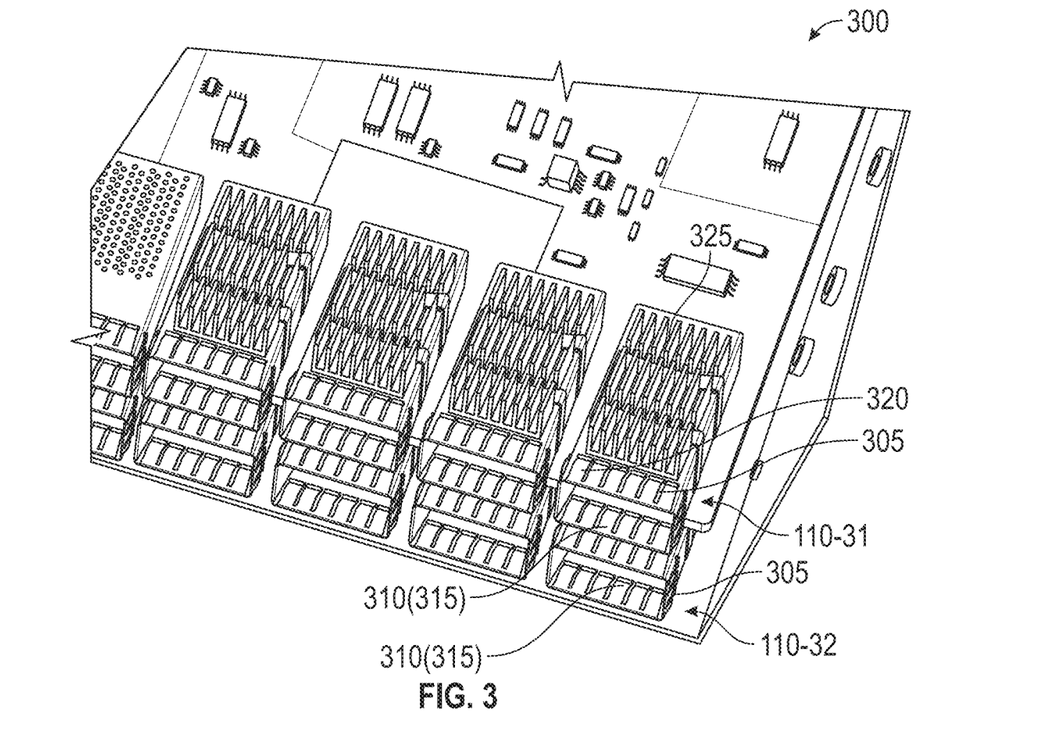
FIG. 3 illustrates receptacles of an optical network device, according to one or more embodiments.

FIG. 3 is a diagram 300 illustrating receptacles of a network device, according to one or more embodiments. The features illustrated in the diagram 300 may be used in conjunction with other embodiments, e.g., representing a portion of the network device 100 of FIG. 1 with the enclosure 105 removed.

Each receptacle 110-31, 110-32 comprises a cage 305 dimensioned to receive an optical module (e.g., the optical module 200 of FIG. 2). The cages 305 may be formed of any material(s) providing structural rigidity to support the optical module, providing thermal conductivity, and/or providing electromagnetic interference (EMI) shielding. In some embodiments, the cages 305 are formed of folded sheet metal.

The optical module is received into the receptacle 110 through an opening 310 formed in the cage 305. The opening 310 is in fluid communication with an interior volume 315 of the cage 305. The cages 305 may include a guide rail or other feature to guide insertion and/or removal of the optical module into the receptacle 110.

In some embodiments, a heat sink assembly 325 is rigidly attached to the cage 305 (e.g., using threaded fasteners or a pressure-sensitive adhesive). In some embodiments, "rigidly attached" may be a permanent attachment or may be detachable. In some embodiments, "rigidly attached" means that at least a portion of the heat sink assembly 325 is arranged at a fixed distance from a portion of the cage 305. In some cases, the portion of the heat sink assembly 325 may itself be rigid. The heat removal mechanism of the heat sink assembly 325 may have any suitable implementation, including metallic fins, a heat pipe, a vapor chamber, or a liquid-cooled plate. In some embodiments, the heat sink assembly 325 includes a base to which the cages 305 and/or the heat removal mechanism attaches.

In some embodiments, an exterior surface 320 of the cage 305 (as shown in the diagram 300, a top surface of the cage 305) has an opening (not shown) defined therethrough. The heat sink assembly 325 comprises a thermal interface material that extends through the opening in the exterior surface 320, into the interior volume 315 of the cage 305. The thermal interface material is compressible, and is configured to compress when the optical module is received into the interior volume 315 and contacts the thermal interface material. Using the example of FIG. 2, when the optical module 200 is received into the interior volume 315, the top surface 230 of the housing 205 contacts the thermal interface material.

In the example shown in the diagram 300, the thermal interface material of the heat sink assembly 325 extends into the interior volume 315 of the receptacle 110-31, which is stacked above the receptacle 110-32. In some embodiments, heat generated by an optical module inserted in the receptacle 110-32 may be conducted, through the cages 305 and/or one or more thermally conductive components, to the heat sink assembly 325 arranged above the receptacle 110-31.

Figure 4:
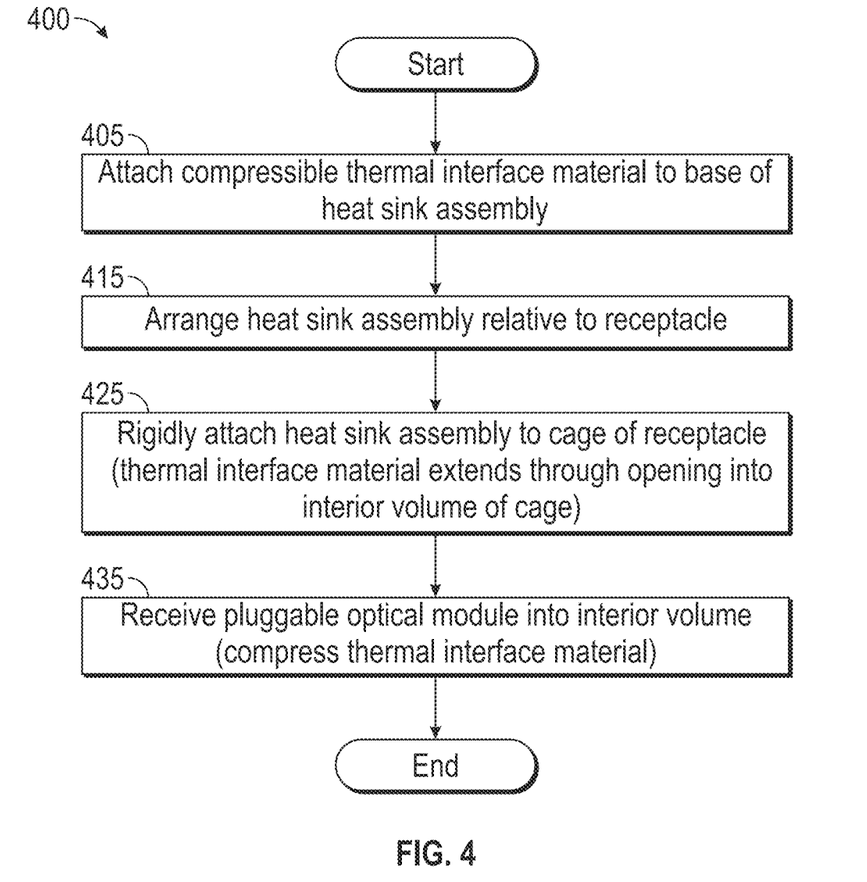
FIG. 4 is a method of fabricating an optical apparatus, according to one or more embodiments.

FIG. 4 is a method 400 of fabricating an optical apparatus, according to one or more embodiments. The method 400 may be used in conjunction with other embodiments, e.g., to fabricate the network device depicted in FIG. 3.

The method 400 begins at block 405, where a compressible thermal interface material is attached to a base of a heat sink assembly. In some embodiments, the thermal interface material is attached to the base using a pressure-sensitive adhesive. For example, an adhesive layer may be integrated into the thermal interface material, offering improved thermal performance compared to an adhesive added between the base and the thermal interface material.

At block 415, the heat sink assembly is arranged relative to a receptacle. In some embodiments, the heat sink assembly is arranged such that the thermal interface material is aligned with an opening defined in an exterior surface of a cage of the receptacle.

At block 425, the heat sink assembly is rigidly attached to the cage of the receptacle. In some embodiments, the thermal interface material extends through the opening into an interior volume of the cage. In some embodiments, rigidly attaching the heat sink assembly to the cage comprises one of tightening one or more threaded fasteners, or applying a pressure-sensitive adhesive. In some embodiments, rigidly attaching the heat sink assembly and the cage causes the thermal interface material to extend into the interior volume. In other embodiments, arranging the heat sink assembly relative to the receptacle causes the thermal interface material to extend into the interior volume.

At block 435, a pluggable optical module is received into the interior volume of the cage. In some embodiments, receiving the optical module into the interior volume compresses the thermal interface material. The method 400 ends following completion of block 435.

Figure 5A:
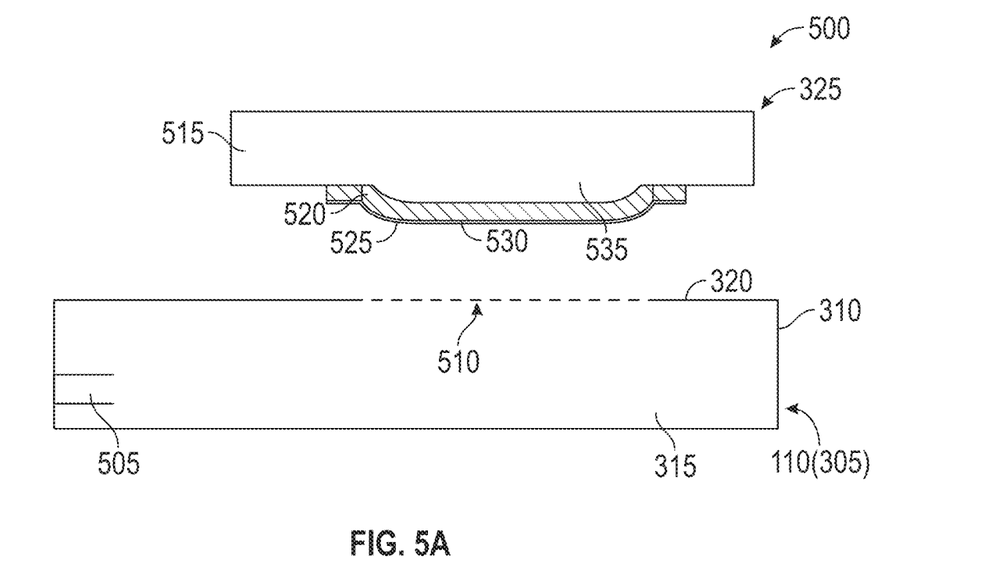
FIGS. 5A and 5B illustrate a sequence of fabricating an optical apparatus, according to one or more embodiments.
Figure 5B:
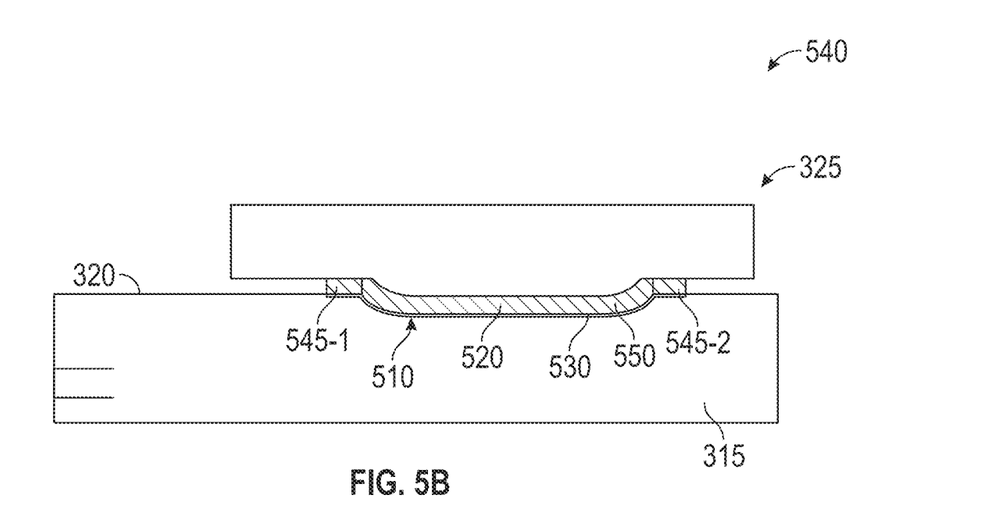

FIGS. 5A and 5B illustrate a sequence of fabricating an optical apparatus, according to one or more embodiments. Diagrams 500, 540 are cross-sectional views illustrating the arrangement and attachment of the heat sink assembly 325 to a receptacle, and the sequence depicted in the diagrams 500, 540 generally corresponds to the method 400 of FIG. 4.

The heat sink assembly 325 comprises a base 515 attached to a thermal interface material 520. The base 515 may be formed of any material(s) that provides sufficient thermal conductivity and structural rigidity, such as metal. In some embodiments, the base 515 comprises the heat removal mechanism, which may be implemented in any suitable form such as metallic fins, a heat pipe, a vapor chamber, or a liquid-cooled plate. Although not depicted in the diagrams 500, 540, the heat sink assembly 325 may include additional components, such as a heat removal mechanism that is distinct from, and attached to, the base 515.

The thermal interface material 520 may be formed of any material(s) providing suitable mechanical compliance (e.g., compressibility) and thermal conductivity. In some embodiments, the thermal interface material 520 comprises a fiber-reinforced resin material having a thermal conductivity between about 2 watts per meter Kelvin (W/m-K) and about 6 W/m-K, and a Young's Modulus between about 50 kilopascals (kPa) and 150 kPa. One non-limiting example of the thermal interface material 520 is Bergquist® Gap Pad® TGP HC3000 (trademarks assigned to Henkel IP & Holding GmbH LLC).

In some embodiments, the thermal interface material 520 comprises an integrated adhesive layer, which may offer improved thermal performance compared to an adhesive added between the base and the thermal interface material. In some embodiments, the integrated adhesive layer comprises a pressure-sensitive adhesive. In some embodiments, a film 525 is disposed on the thermal interface material 520. The film 525 may be formed of any material(s), and may have a thickness selected, to provide suitable thermal performance. Some non-limiting examples of the materials for the film 525 include vinyl, polyester, polypropylene, and other plastics. In some embodiments, the film 525 may reduce friction between the optical module and the thermal interface material 520 when the optical module is inserted into the receptacle 110.

A bottom surface 530 of the heat sink assembly 325 is defined by the thermal interface material 520 or by the film 525. In some embodiments, the bottom surface 530 is a substantially planar surface that is configured to contact a substantially planar surface of the optical module (e.g., the top surface 230 of FIG. 2).

In some embodiments, the base 515 defines a flat, planar surface to which the thermal interface material 520 is attached. In some embodiments, the base 515 is contoured (e.g. including a projecting portion 535) such that the base 515 extends through an opening 510 into the interior volume 315 when the heat sink assembly 325 is rigidly attached to the cage 305.

The thermal interface material 520 may have a uniform thickness or a varying thickness. For example, in cases where the base 515 defines a flat, planar surface, the thermal interface material 520 may be thicker in a portion that extends into the interior volume 315. In cases where the base 515 includes the projecting portion 535, the thermal interface material 520 may have a uniform thickness.

The opening 510 is defined in the exterior surface 320 of the cage 305. The cage 305 further comprises a connector 505 that is configured to receive the edge connector of the optical module when inserted. In some embodiments, the connector 505 is configured to form connections with electrical components of the optical module.

In the diagram 540, the heat sink assembly 325 is arranged relative to the cage 305, such that the thermal interface material 520 extends through the opening 510 into the interior volume 315. From this arrangement, the heat sink assembly 325 may be rigidly attached to the cage 305, e.g., using one or more threaded fasteners or a pressure-sensitive adhesive.

In some embodiments, a surface area of the thermal interface material 520 in an uncompressed state is greater than a surface area of the opening 510. In this case, lateral portions 545-1, 545-2 of the thermal interface material 520 are compressed between the base 515 and the cage 305 when the heat sink assembly 325 is rigidly attached to the cage 305.

In some embodiments, the portion of the heat sink assembly 325 that extends through the opening 510 into the interior volume 315 is contoured to reduce an insertion force of the optical module. As shown, the contoured portion 550 of the thermal interface material 520 is curved between the lateral portion 545-2 and the bottom surface 530. Other types of contouring are also possible (e.g., the contoured portion 550 may be linearly sloped). In some embodiments, the contoured portion 550 may be used in conjunction with the film 525 to further reduce the insertion force.

Figure 6A:
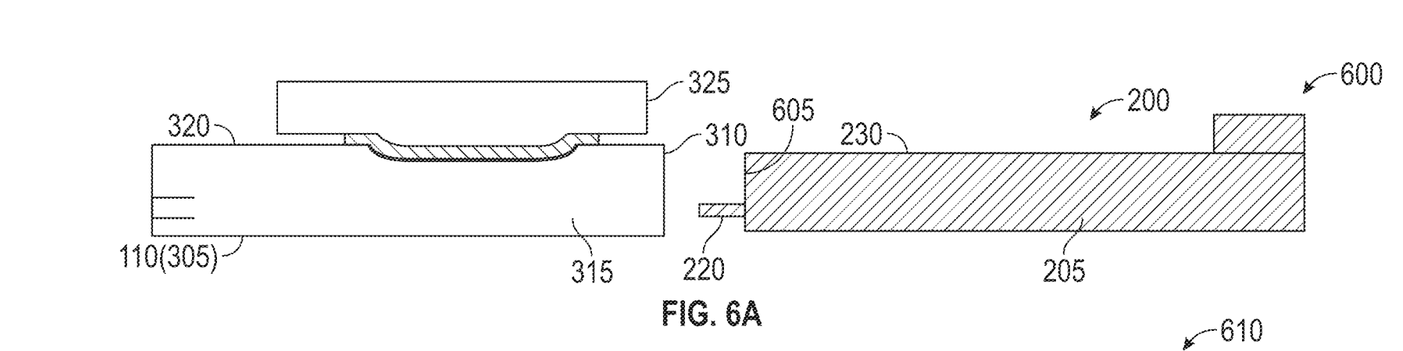
FIGS. 6A, 6B, and 6C illustrate a sequence of inserting a pluggable optical module into a network device, according to one or more embodiments.
Figure 6B:
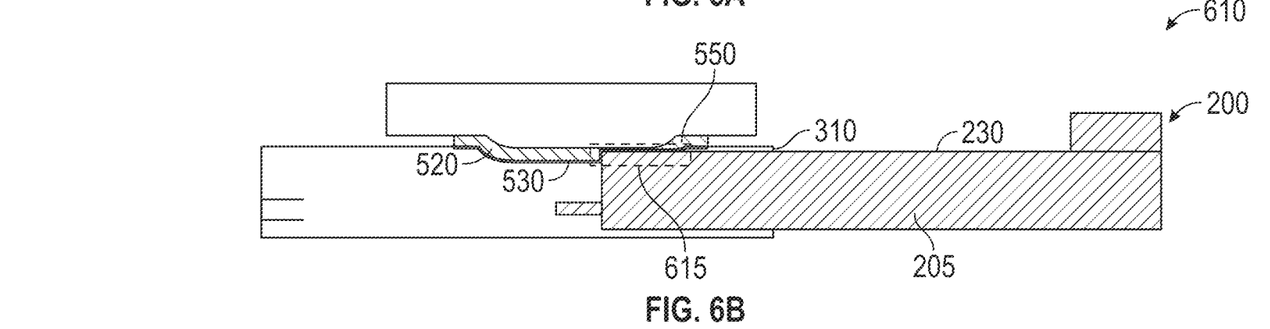
Figure 6C:
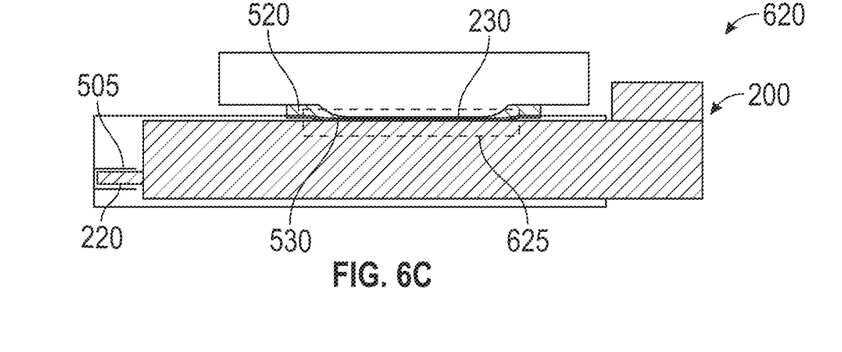

FIGS. 6A, 6B, and 6C illustrate a sequence of inserting an optical module into a network device, according to one or more embodiments, Diagrams 600, 610, 620 are cross-sectional views illustrating the insertion of the optical module 200 into the receptacle 110.

In the diagram 600, the optical module 200 is arranged outside the cage 305. The edge connector 220 and a leading edge 605 of the housing 205 are aligned with the opening 310 formed in the cage 305.

In the diagram 610, the optical module 200 is received into the receptacle 110 through the opening 310. In some embodiments, a guide rail or other feature of the cage 305 may guide insertion of the optical module 200 into the receptacle 110. During the insertion process, the leading edge 605 of the housing 205 contacts the contoured portion 550 of the thermal interface material 520, and the top surface 230 of the housing 205 contacts the bottom surface 530 of the heat sink assembly 325. The insertion of the optical module 200 causes the thermal interface material 520 to compress in a region 615. Beneficially, compression of the thermal interface material 520 may operate to fill any air pockets and thereby reduce a thermal resistance between the optical module 200 and the heat sink assembly 325. Notably, the base 515 of the heat sink assembly 325 remains in a fixed arrangement with the cage 305 during insertion of the optical module 200, relying on the compliance of the thermal interface material 520 to accommodate the optical module 200.

In the diagram 620, the optical module 200 is inserted fully into the receptacle 110, such that the edge connector 220 is mated to the connector 505. The insertion of the optical module 200 causes the thermal interface material 520 to compress in a region 625. In some embodiments, the bottom surface 530 when the thermal interface material 520 is compressed forms a substantially planar interface with the top surface 230 of the optical module 200.

Figure 7A:
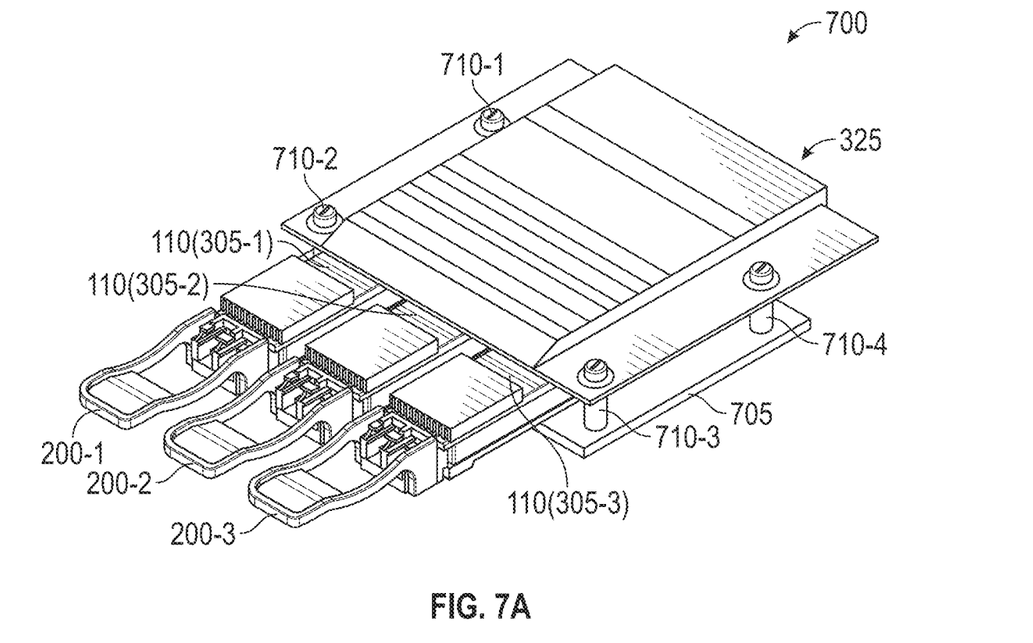
FIGS. 7A and 7B illustrate a heat sink assembly for multiple receptacles, according to one or more embodiments.
Figure 7B:
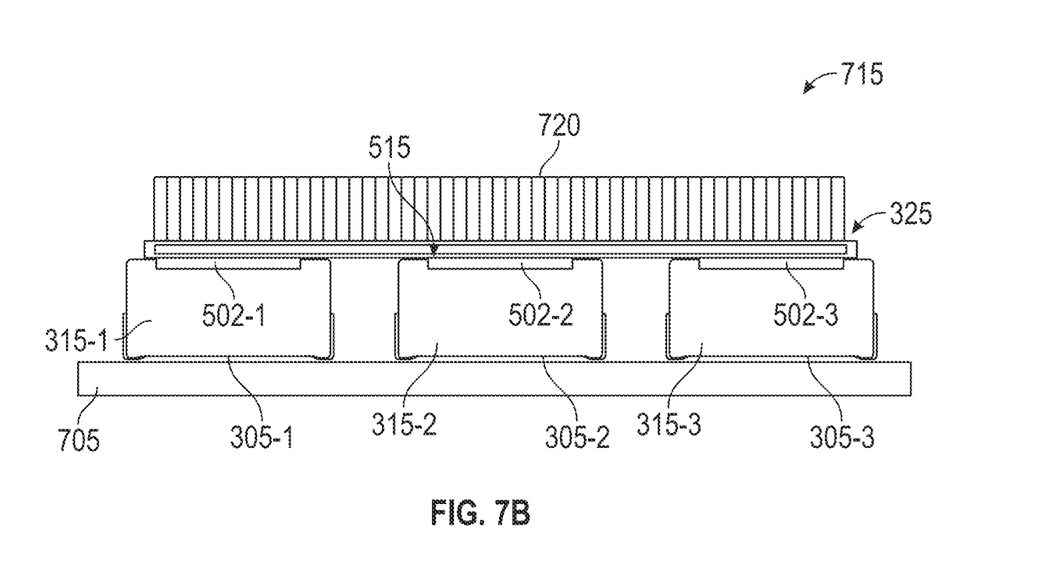

FIGS. 7A and 7B illustrate a heat sink assembly 325 for multiple receptacles 110, according to one or more embodiments. Diagram 700 provides a perspective view with optical modules 200-1, 200-2, 200-3 inserted into three (3) receptacles 110, and diagram 715 provides a cross-section view with the optical modules 200-1, 200-2, 200-3 not inserted. Although three receptacles 110 are shown, other numbers of receptacles 110 are also contemplated.

The three receptacles 110 share the heat sink assembly 325. A plurality of cages 305-1, 305-2, 305-3 are mounted to a circuit board 705 or another substrate, and the heat sink assembly 325 (e.g., the base 515) is rigidly attached to the receptacles 110 (e.g., the cages 305-1, 305-2, 305-3). As shown, threaded fasteners 710-1, 710-2, 710-3, 710-4 rigidly attach the heat sink assembly 325 to the circuit board 705.

In the diagram 715, the heat sink assembly 325 comprises metallic fins 720 attached to the base 515. Thermal interface materials 520-1, 520-2, 520-3 (collectively or generically, thermal interface material 520) respectively extend into the interior volumes 315-1, 315-2, 315-3 of the cages 305-1, 305-2, 305-3. When the optical modules 200-1, 200-2, 200-3 are inserted into the respective interior volumes 315-1, 315-2, 315-3, the thermal interface materials 520-1, 520-2, 520-3 are compressed (as shown, in an upward direction).

Figure 8:
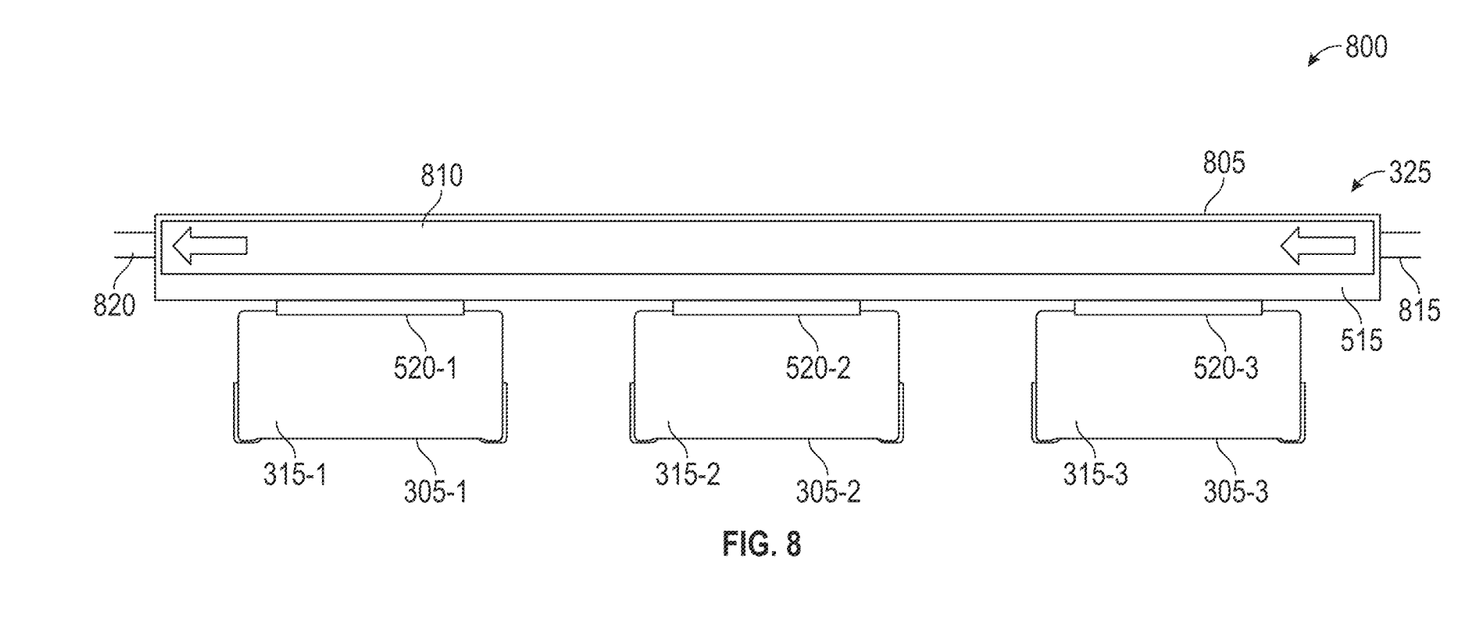
FIG. 8 illustrates a heat sink assembly comprising a liquid-cooled plate, according to one or more embodiments.

In diagram 800 of FIG. 8, the heat sink assembly 325 comprises a liquid-cooled plate 805 that is attached to the base 515 and that has a channel 810 defined therein. The liquid-cooled plate 805 further comprises an inlet 815 and an outlet 820 in fluid communication with the channel 810.

Beneficially, the compliance of the thermal interface material 520 may enable the use of rigid or less flexible implementations of the heat sink assembly 325, such as the liquid-cooled plate 805. For example, rigid implementations of the heat sink assembly 325 may not be suitable for spring-based implementations where the base 515 is configured to displace upward when an optical module is inserted into the interior volume 315, which may be especially true in the case of multiple receptacles 110.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:
a receptacle comprising a cage dimensioned to receive a pluggable optical module into an interior volume, wherein an opening is defined in an exterior surface of the cage; and
a heat sink assembly rigidly attached to the cage, wherein the heat sink assembly comprises a base and a thermal interface material coupled to the base, the thermal interface material extending through the opening into the interior volume, wherein the thermal interface material is configured to compress against the base such that the thermal interface material fills an air pocket between the thermal interface material and the pluggable optical module when the pluggable optical module is received into the interior volume and contacts the thermal interface material.

2. The apparatus of claim 1, wherein the base is contoured such that the base extends through the opening into the interior volume when the heat sink assembly is rigidly attached to the cage.

3. The apparatus of claim 1, wherein a surface area of the thermal interface material in an uncompressed state is greater than a surface area of the opening, and wherein lateral portions of the thermal interface material are compressed between the base and the cage when the heat sink assembly is rigidly attached to the cage.

4. The apparatus of claim 1, further comprising:
one or more additional receptacles each configured to receive a respective pluggable optical module,
wherein the heat sink assembly is rigidly attached to the one or more additional receptacles.

5. The apparatus of claim 1, wherein the heat sink assembly comprises one of the following:
metallic fins;
a heat pipe; or
a vapor chamber.

6. The apparatus of claim 1, wherein the heat sink assembly comprises a liquid-cooled plate.

7. The apparatus of claim 1, wherein the thermal interface material is contoured to reduce an insertion force of the pluggable optical module.

8. The apparatus of claim 1, wherein the heat sink assembly is rigidly attached to the cage using one of:
one or more threaded fasteners; or
a pressure-sensitive adhesive.

9. The apparatus of claim 1, wherein the thermal interface material comprises a fiber-reinforced resin material.

10. The apparatus of claim 1, wherein the heat sink assembly further comprises:
a film disposed on the thermal interface material to reduce friction between the pluggable optical module and the thermal interface material.

11. A method of fabricating an optical apparatus, the method comprising:
arranging a heat sink assembly relative to a receptacle, wherein the receptacle comprises a cage dimensioned to receive a pluggable optical module into an interior volume, wherein an opening is defined in an exterior surface of the cage; and
rigidly attaching the heat sink assembly to the cage, whereby a thermal interface material of the heat sink assembly extends through the opening into the interior volume, wherein the thermal interface material is configured to compress against a base coupled to the thermal interface material such that the thermal interface material fills an air pocket between the thermal interface material and the pluggable optical module when the pluggable optical module is received into the interior volume and contacts the thermal interface material.

12. The method of claim 11, wherein the base is contoured such that the base extends through the opening into the interior volume when the heat sink assembly is rigidly attached to the cage.

13. The method of claim 11, wherein a surface area of the thermal interface material in an uncompressed state is greater than a surface area of the opening, and
wherein lateral portions of the thermal interface material are compressed between the base and the cage when the heat sink assembly is rigidly attached to the cage.

14. The method of claim 11, further comprising:
rigidly attaching the heat sink assembly to one or more additional receptacles each configured to receive a respective pluggable optical module.

15. The method of claim 11, wherein the heat sink assembly comprises one of the following:
metallic fins;
a heat pipe;
a vapor chamber; or
a liquid-cooled plate.

16. The method of claim 11, wherein the thermal interface material is contoured to reduce an insertion force of the pluggable optical module.

17. The method of claim 11, wherein rigidly attaching the heat sink assembly to the cage comprises one of:
tightening one or more threaded fasteners; or
applying a pressure-sensitive adhesive.

18. An apparatus comprising:
a plurality of receptacles, each receptacle comprising a respective cage dimensioned to receive a pluggable optical module into a respective interior volume, wherein a respective opening is defined in an exterior surface of the respective cage; and
a heat sink assembly rigidly attached to the respective cages of the plurality of receptacles, wherein the heat sink assembly comprises a base and a thermal interface material coupled to the base, the thermal interface material extending through the respective openings into the respective interior volumes, wherein the thermal interface material is configured to compress against the base such that the thermal interface material fills an air pocket between the thermal interface material and the pluggable optical module when the pluggable optical module is received into any of the respective interior volumes and contacts the thermal interface material.

19. The apparatus of claim 18, wherein the base is contoured such that the base extends through the respective openings into the respective interior volumes when the heat sink assembly is rigidly attached to the respective cages of the plurality of receptacles.

* * * * *